United States Patent [19]

Kirsch

[11] Patent Number: 4,546,347

[45] Date of Patent: Oct. 8, 1985

[54] DETECTOR FOR ELECTRO-OPTICAL MOUSE

[75] Inventor: Steven T. Kirsch, Sunnyvale, Calif.

[73] Assignee: Mouse Systems Corporation, Santa Clara, Calif.

[21] Appl. No.: 508,070

[22] Filed: Jun. 24, 1983

Related U.S. Application Data

[63] Continuation-in-part of Ser. No. 264,478, May 18, 1981, Pat. No. 4,390,873.

[51] Int. Cl.[4] .................................................. G08B 5/36
[52] U.S. Cl. ...................................... 340/710; 178/18; 250/237 R; 340/707
[58] Field of Search .................. 340/710, 707, 870.29, 340/706, 365 P; 178/18; 250/237 R, 237 G, 201

[56] References Cited

U.S. PATENT DOCUMENTS

| | | | |
|---|---|---|---|
| 3,297,879 | 1/1967 | Meyer | 250/237 R |
| 3,957,378 | 5/1976 | Zipin | 250/237 G |
| 4,022,969 | 5/1977 | McKinlay | 340/710 |
| 4,074,131 | 2/1978 | Schwebel | 250/237 G |
| 4,176,276 | 11/1979 | Kaul | 250/237 G |
| 4,303,914 | 12/1981 | Page | 340/706 |
| 4,364,035 | 12/1982 | Kirsch | 340/707 |
| 4,384,204 | 5/1983 | Tamaki | 250/237 G |
| 4,385,836 | 5/1983 | Schmitt | 250/237 G |
| 4,390,873 | 6/1983 | Kirsch | 340/710 |
| 4,409,479 | 10/1983 | Sprague | 340/710 |

FOREIGN PATENT DOCUMENTS 4465373  8/1984  U.S.S.R. .......................... 250/237 G

Primary Examiner—John W. Caldwell, Sr.
Assistant Examiner—Michael F. Hein

[57] ABSTRACT

A detector of an electro-optical mouse having two linear arrays of detector cells at right angles to each other. One linear array images a line and a space in the X direction, while another linear array images a line and a space in the Y direction. Changes in contrast level indicate line crossings. Each linear array has four cells, adjacent cells being 90° out-of-phase with each other. By pairing first and third cells and second and fourth cells of each linear array, then subtracting the output of these, a 180° shift between the cells enhances discrimination of lines and spaces. Lines may be of two colors, or of a single color with optically contrasting line intersections, so long as a total of three contrast levels can be observed by the detector. Counting means is provided for counting line crossings so that observed detector motion on the surface can be made to correspond to cursor motion for a video display.

19 Claims, 3 Drawing Figures

DETECTOR FOR ELECTRO-OPTICAL MOUSE

CROSS REFERENCE TO RELATED APPLICATION

This is a continuation-in-part of application Ser. No. 264,478, filed May 18, 1981, now U.S. Pat. No. 4,390,873, issued June 28, 1983.

TECHNICAL FIELD

A mouse is a pointing device, typically for use with visual display systems in which a transducer converts translational motion of a housing into a position signal for controlling the movement of a cursor associated with a visual display system. More particularly, the present invention relates to a detector for interpreting the position of the housing over a grid of lines.

BACKGROUND ART

In U.S. Pat. No. 4,364,035 a mouse is disclosed movable over a two-color grid of lines on a reflective surface. The lines are made with optically transmissive inks and are illuminated by a dual color monochromatic light source, such as a two-color LED, which rapidly and continuously switches from one color to the other. The colors of the light source are selected to match the spectral transmissivity of the two-color grid on the surface. Typically a set of parallel, equally spaced lines would have one color and an orthogonal set of parallel, equally spaced lines would have another second color with white or metallic reflective surfaces between lines. An illuminated surface area is imaged onto a light detector, within a housing movable over the surface. During illumination by light of one color, the detector distinguishes lines only of the other color, which appear dark against the reflective field. As the focal area within the housing crosses lines, the detector senses changes in contrast ratio and generates electrical signals representing the line crossings. If the lines are arranged in a grid, line crossings of one color may represent horizontal distance, while line crossings of the other color represent horizontal distance. The crossings may be counted by X and Y registers for controlling a cursor.

The same patent describes an alternate embodiment of the invention wherein two sources and a plurality of detector cells are provided. Instead of switching colors in a dual color source, a first pair of detector cells is sensitive to one color, while another pair of detector cells is sensitive to the opposite color. For example, two cells may be aligned for horizontal right and left detection, while two perpendicular cells may be aligned for vertical up and down motion detection. Unlike the previously described embodiment, this embodiment requires no clocking of the source and detector.

In the aforementioned patent, it was necessary to take the detected signals and compare them against a common reference signal from a voltage source, known as a threshold voltage. The threshold voltage might be set by a microprocessor. Disadvantages of this absolute threshold technique include inability to compensate for wide component variation, low signal-to-noise ratio and difficulty in establishing the threshold.

An object of the invention was to eliminate the use of the threshold signal and simplify electrical circuits required to read detector cells. Another object was to obviate the need for highly reflective lines by improving the signal-to-noise ratio of detection circuits for an optical mouse.

DISCLOSURE OF INVENTION

The above objects have been achieved with a detector cell configuration for an electro-optical mouse which uses two pairs of detector cells for each direction, each double pair aligned in a linear array. As the mouse moves over a grid surface, the lines and spaces of the grid are imaged onto the detector cells so that each cell is 90° out-of-phase with respect to its adjacent cells. The first and third cells, which are 180° out of phase with respect to each other are subtracted in a difference amplifier to give one signal. The second and fourth cells, which are 180° out of phase with respect to each other, are subtracted to give a second signal. This second signal is 90° out-of-phase with respect to the first signal. Phase shifts are determined by controlling line and space widths relative to the area imaged by each detector cell. Two adjacent cells are able, and only able, to image a space or line, while the next adjacent cell images the opposite of these, thereby creating a 180° out-of-phase signal in the third cell relative to the first cell and in the fourth cell relative to the second cell.

This "differential technique" can be extended to two-dimensional tracking by using a multi-color grid pad. One cell may be shared so that only 7 cells are required. Because we are using a differential scheme, the reflective surface may be printed in a variety of ways, e.g. blue horizontal lines and black vertical lines or black horizontal lines and black vertical lines such that at the intersection, the intensity is "doubly black." Hence, only one color of light is required in this case.

In summary, the use of multiple shades of color on the pad distinguishes this technique from all other techniques. Three levels of contrast are required: two for the lines and one for the spaces. The use of differential signals allows greater freedom in the choice of light sources and line colors.

Another method is to use a single color of light and a single color of lines. However, the intersection of the lines must be darker than the lines themselves. Since the detector uses a differential technique, the orthogonal set of lines appears as a common-mode signal. Once again, three levels of contrast are required: one for the lines, one for the intersections and one for the spaces.

Alternate pairs of cells are aligned in the same direction and are connected to the same difference amplifier for measuring contrast differences. By this means of connection, threshold voltages are eliminated. By providing four cells in one direction and four cells in an orthogonal intersecting direction, two pairs of output signals may be provided, one pair corresponding to horizontal right and left; and a pair corresponding to vertical up and down. These are the same outputs which are regarded to be standard for most mice. Such signals are suitable for controlling a cursor or the like.

BEST MODE FOR CARRYING OUT THE INVENTION

Figure 1:
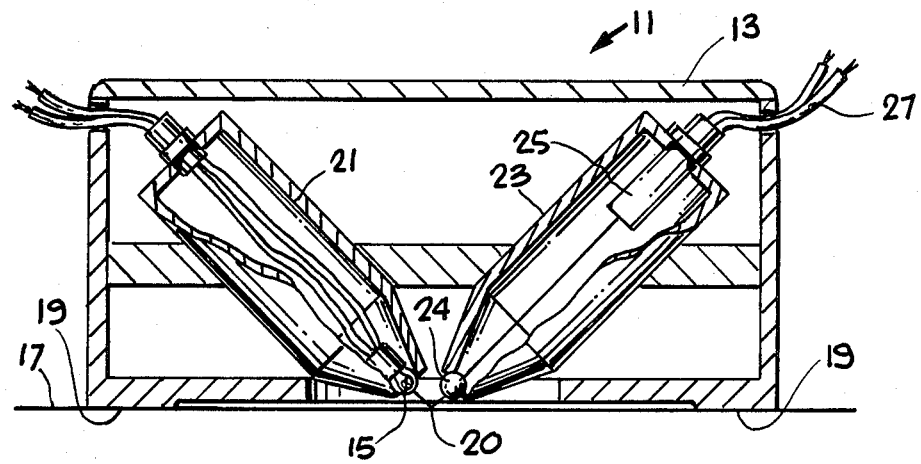
FIG. 1 is a side view of an electro-optical mouse having a detector in accord with the present invention.

With reference to FIG. 1 an optical mouse 11 includes a housing 13, containing a light source 15 as well as a detector 25. The housing is gripped by human hand and pushed in any direction over a surface 17, corresponding to the direction and extent to which it is desired to move a cursor or similar device. Housing 13 fits in the palm of a hand and has low friction feet 19 which contact surface 17.

Source 15 is a light emitting diode, LED, which is aimed downwardly at a spot 20 on surface 17. The source must be a color of light such that two colored sets of lines forming a line pattern on the surface appear differently at the detector. For this purpose two sources are preferred, each having a different color. Alternatively, a single source alternating between two colors could be used. One source color should be highly absorbed and only slightly reflective by one set of lines but not the other which only lightly absorbs and moderately reflects this source. The other source color behaves similarly, but with high light absorption by the second set of lines. Since only lines of moderate reflectivity are seen by multiple detector cells, such cells may be paired, with each member of the pair detecting one of the sets of lines.

Source 15 is a light emitting diode which is mounted in a supporting tube 21. Detector 25 is mounted in a light tight tube 23 having a lens 24 focussing on spot 20. Lens 24 directs light reflected from spot 20 onto detector 25. The detector puts out electrical signals, corresponding to optical signals which are received on lines 27.

Figure 2:
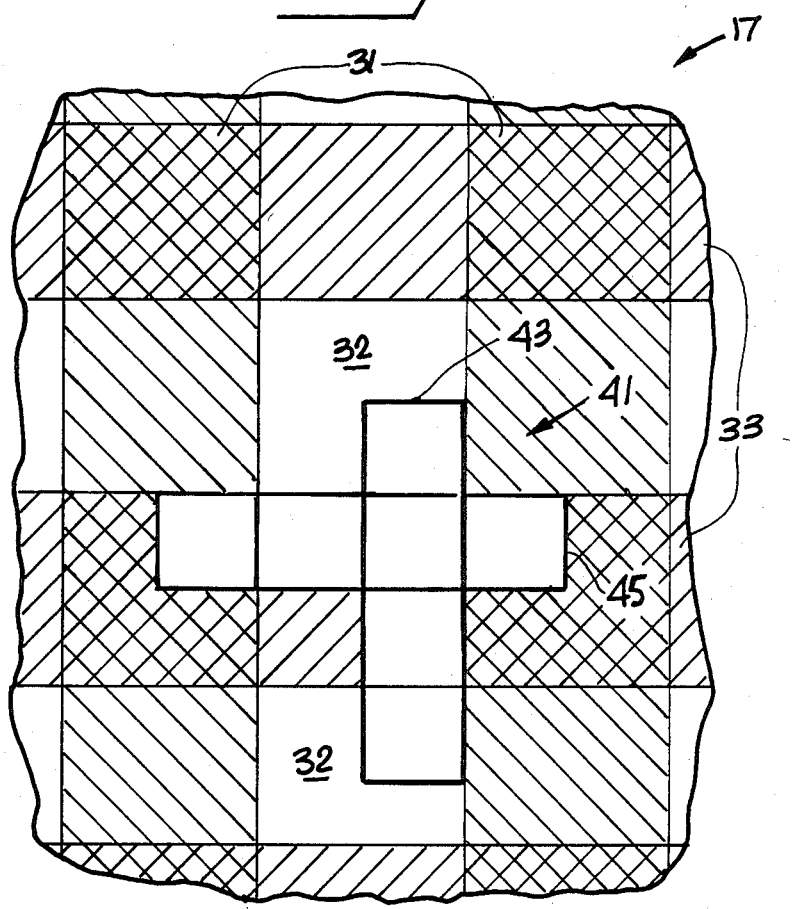
FIG. 2 is a plan view of a portion of a grid pattern for use with the apparatus of FIG. 1, indicating the relative size of the area observed by the detector cell array of FIG. 1 in relation to the grid pattern.

FIG. 2 shows a portion of the surface 17. The surface consists of a grid of lines having one or two transparent colors over a white or reflective background. One set of spaced apart lines, vertical lines 31, has a first color. Another set of spaced apart lines, horizontal lines 33, has a second color. The images of the lines formed by the linear detector cell array are such that the images span the dimension of two lines in each direction. In other words, two cells, or rather the corresponding area imaged by two cells, spans the width of one space or line and the next two cells in a row span the width of the next line or space. Cells one and three cannot image the same line or space, but must image a line and a space. The same holds true for cells two and four. Cells one through four form a linear array, with two orthogonal linear arrays needed for X-Y motion encoding. The two orthogonal arrays can share a common cell if the two arrays overlap. Four cells in a row image contrasting lines completely. Cyclically this corresponds to 360°, with each detector receiving an optical signal 90° out of phase relative to an adjacent cell in the same row. The vertical lines 31 and the horizontal lines 33 have approximately the same width. The spaces 32 between lines have a color which is distinguishable from the lines in terms of contrast at the detector and a width approximately equal to the line width. Typically, the line width would be a few tenths of a millimeter, so long as the line is imaged by two adjacent cells.

The two colors of the grid may actually be the same color if the intersections are a different color. This is necessary to afford contrast between an intersection and an adjacent grid line if it has color. In all instances, three levels of contrast are necessary. In one case the three levels are achieved by two different, transparent colors of lines and by spaces between lines. In another case, the three levels are achieved by lines of the same color, intersections of a different color due to overlap, and spaces between lines.

One disadvantage of this single color technique is that if the mouse is rotated more than 45°, the axes switch (i.e., the horizontal cells sense vertical motion). A greater degree of rotation insensitivity may be obtained by using different line widths for the horizontal versus vertical lines, e.g. horizontal lines are 1 mm wide with 1 mm between lines and vertical lines are 0.5 mm wide with 0.5 mm between lines. The images on the detector cells would be asymmetric, as would the detector cells themselves.

In the case of two colors of lines, each detector array is filtered so that it images at one intensity level only the lines it is supposed to observe and the other lines and spaces are imaged at another intensity level. The detector array is formed by two rows of cells 43 and 45, extending in directions which correspond to the directions of the vertical and horizontal grid lines 31 and 33 in FIG. 2. In FIG. 2, the detector cells are greatly enlarged, the cells may be transistors of a CCD array. While there is no upper limit to the number of detector cells which may be used for purposes of the present invention, the lower recommended limit is seven cells, with a single common cell in both row 43 and row 45. If there is no sharing of such a cell, eight cells are needed.

Figure 3:
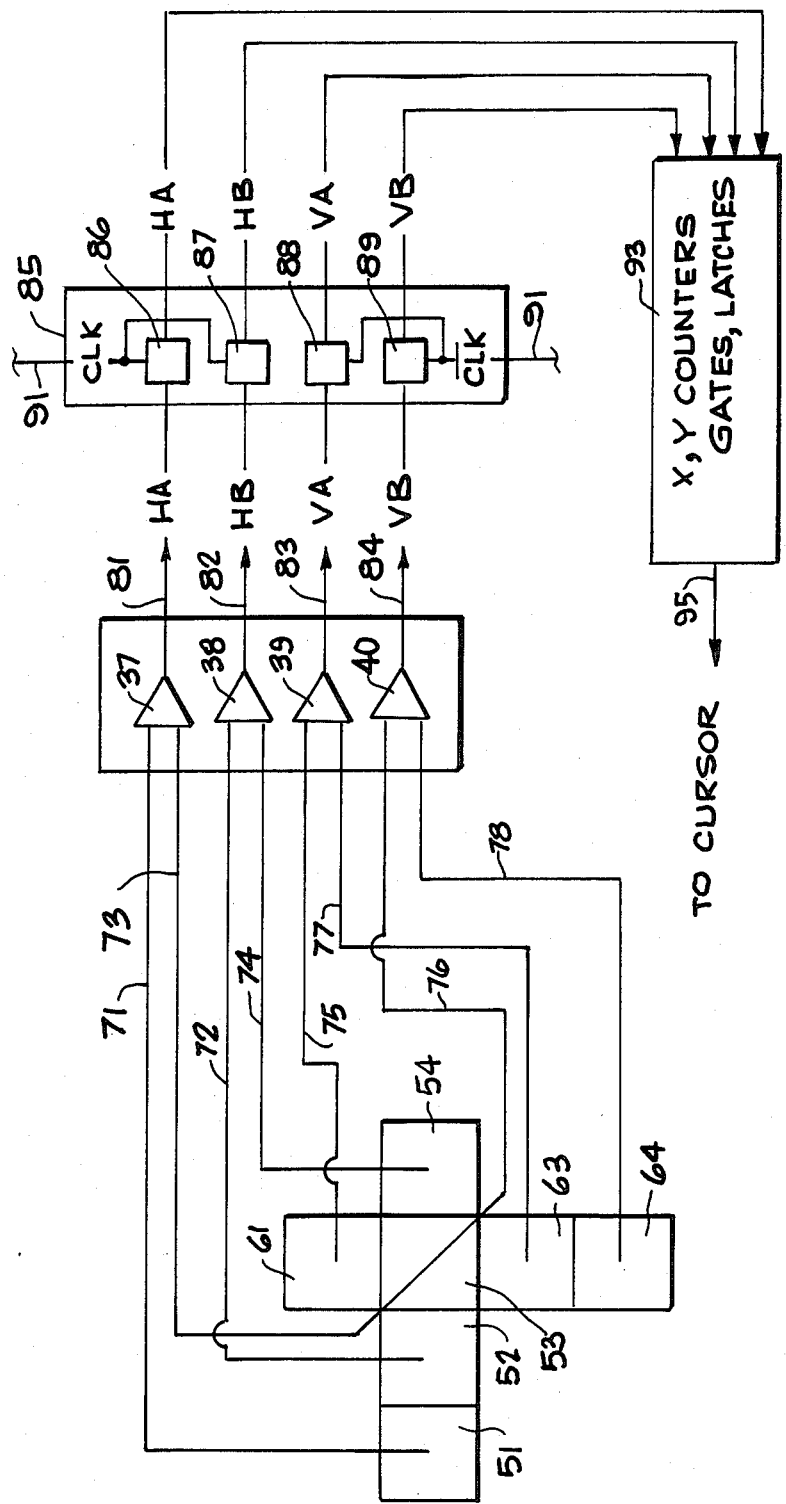
FIG. 3 is an electrical diagram of a circuit used with the seven cell detector of FIG. 2.

FIG. 3 shows the electrical connection of cells. Each of the difference amplifiers 37, 38, 39 and 40 is connected to a pair of cells. Difference amplifier 37 is connected to the cells 51 and 53. Difference amplifier 38 is connected to the alternate cells 52 and 54. Difference amplifier 39 is connected to cells 61 and 63. Difference amplifier 40 is connected to the cells 53 and 64. By connecting alternate cells to a difference amplifier, there is sufficient spacing between cells so that when one cell of a pair is detecting a line, the other is detecting an adjacent space. If adjacent cells were connected to a difference amplifier, it might be possible for both cells to be detecting a line or a space, but this is not the case. The spacing of the cells should be such that alternate cells cannot both simultaneously detect a line. If spaces are of the same dimension as lines, two alternate cells should not be able to simultaneously detect a space. Accordingly, the present detector cell pattern is adapted to detect line crossings by distinguishing contrast ratios of lines and spaces, contrast being enhanced by subtraction of out of phase signals. Intersections of lines retain the characteristic color of line pattern being seen in the detector array.

Optical signals representing differences in reflectivity are picked up by the cells and transmitted along corresponding lines to the difference amplifiers where electrical subtraction occurs. For example, cells 51 and 53 transmit electrical signals along lines 71 and 73 to difference amplifier 37. Cells 52 and 54 transmit electrical signals along lines 72 and 74 to difference amplifier 38. Cells 61 and 63 transmit electrical signals along lines 75 and 77 to difference amplifier 39. Cells 53 and 64 transmit electrical signals along lines 76 and 78 to difference amplifier 40. The difference amplifiers generate output signals along output lines 81, 82, 83 and 84. These output signals correspond to horizontal left and right and vertical up and down signals. These are denominated HA HB and VA and VB, respectively.

If two colors of illumination are used, for example from two color LEDS, and only one detector is used, then the detector is time multiplexed between the LEDS using a clock signal. A latch circuit 85 has latches 86, 87, 88 and 89 electrically connected to respective difference amplifiers 37, 38, 39 and 40. The output from the difference amplifiers are held within the latch circuit until requested by means of the clock signal along line 91. The latches signals, indicative of line crossings, are transmitted to counters 93 which are commercially available and exemplified by a computer manufactured by LISP Machine, Inc. of Cambridge, Mass. or computers manufactured by Xerox Corporation and BBN of Cambridge, Mass. These computers are known to accept a code for many mechanical mice and the present code is identical to that produced by such mice. The output of counters 93 is then fed to a cursor which is displayed on a video display or video terminal.

It should be noted that in the present invention diagonal motion of the mouse is not a problem because horizontal and vertical motions are completely orthogonal and separately reported. Note that the difference amplifiers 37 and 38 are dedicated to detecting motion in the horizontal direction. Similarly, difference amplifiers 39 and 40 are dedicated to the vertical direction.

The detector array is shown to be connected to difference amplifiers. However, individual cells could be connected to other sensors which establish contrast differences. Such contrast differences are interpreted as line crossings and the count of such line crossings establishes cursor motion.

I claim:

1. An optical mouse detector system comprising,
    a surface having two sets of lines, one set intersecting the other, with spaces therebetween, each set having a characteristic color and a pre-determined width, the lines and spaces having three levels of contrast, including a first level for the lines, a second level for intersections of the lines and a third level for the spaces,
    two linear arrays of detector cells movable relative to the surface, each linear array capable of imaging one line and one space from the surface, with one linear array parallel in orientation with one of said two sets of intersecting lines, the second linear array parallel in orientation with the other set, said detector cells having optical means associated with two adjacent detector cells in the same linear array for imaging the width of one line which is a member of the set of lines not parallel to the detector array containing said two adjacent cells, and
    means movable over the surface for measuring contrast differences, said means having inputs from two non-adjacent detector cells in the same linear array, said means having an output indicative of contrast differences for signalling line crossings corresponding to changes in contrast differences.

2. The apparatus of claim 1 wherein said two sets of lines have different transparent colors.

3. The apparatus of claim 1 wherein said two sets of lines have the same color, but intersections of said lines have a different color.

4. The apparatus of claim 1 wherein the number of cells in each linear array is four.

5. The apparatus of claim 4 wherein the two linear arrays overlap on one common cell so that the total number of cells is seven.

6. The apparatus of claim 1 wherein the image produced on the cells in one linear array is equal in size to the image produced on the cells in the other linear array.

7. The apparatus of claim 1 wherein the image produced on the cells in one linear array is unequal in size to the image produced on the cells in the other linear array.

8. The apparatus of claim 1 wherein said contrast measuring means is a difference amplifier.

9. An optical mouse detector system comprising,
    a light source disposed in a movable housing having a beam focussed on a surface over which the housing moves, the surface having first and second sets of intersecting orthogonal lines with spaces between individual lines, said two sets of lines and spaces having three levels spaces of contrast, including a first level for the lines, a second level for the intersections of the lines and a third level for the spaces,
    a detector having two linear arrays of more than two detector cells per array aligned with one linear array parallel to each of said orthogonal lines with two non-adjacent detector cells in the same array having output means connected for producing a difference signal representing the optical contrast between said two non-adjacent cells, whereby changes in contrast levels indicate line crossings, and
    counting means connected to the detector for counting said line crossings.

10. The detector of claim 9 wherein the total number of cells in both of said two linear arrays of detector cells is seven.

11. The detector of claim 9 wherein the number of detector cells in each direction is four.

12. The apparatus of claim 9 wherein said two sets of lines have different transparent colors.

13. The apparatus of claim 9 wherein said two sets of lines have the same color, but intersections of said lines have a different color.

14. An optical mouse detector system comprising,
    a surface having a pattern of passive, position-related intersecting lines thereon, with a first and second group of lines and spaces between the lines, presenting different contrast levels to a detector,
    a housing movable over the surface having a light source directed toward the surface, said housing having a detector mounted therein, together with means for imaging and distinguishing two adjacent areas of the surface having different contrast levels, said detector having two non-parallel rows of detector cells including a first row of cells aligned with a first line in said first group of lines and a second row of cells aligned with a second line in said second group of lines, said first and second rows of cells having alternately spaced cells in the same row connected to difference amplifiers for detecting line crossings corresponding to changes in said contrast levels.

15. The apparatus of claim 14 wherein said first and second groups of lines are orthogonal lines and said first and second rows of detector cells are orthogonal.

16. The apparatus of claim 14 wherein the two rows of detector cells intersect so that the total number of detector cells in said first and second rows is seven.

17. The apparatus of claim 14 wherein the number of difference amplifiers connected to said cells is four, with two difference amplifiers connected to cells in each row.

18. The apparatus of claim 14 wherein said two sets of lines have different transparent colors.

19. The apparatus of claim 14 wherein said two sets of lines have the same color, but intersections of said lines have a different color.

* * * * *